United States Patent [19]

Papsin

[11] Patent Number: 4,896,002

[45] Date of Patent: Jan. 23, 1990

[54] METHOD AND APPARATUS FOR DISPLAYING RAW TABLET LOCATION DATA

[75] Inventor: Thomas E. Papsin, Huntington, Conn.

[73] Assignee: Summgraphics Corporation

[21] Appl. No.: 368,287

[22] Filed: Jun. 19, 1989

[51] Int. Cl.[4] ............................................. G08C 21/00
[52] U.S. Cl. ..................................... 178/18; 73/865.9
[58] Field of Search ............... 178/18, 19, 87; 73/1 E, 73/865.9

*Primary Examiner*—Stafford D. Schreyer
*Attorney, Agent, or Firm*—Rosen, Dainow & Jacobs

[57] ABSTRACT

Method and apparatus for enabling a user to test the performance of a digitizer tablet and to reset the tablet from his workstation. The user executes a program which converts raw tablet X/Y coordinate data into a form that can be displayed on the workstation screen and can be readily understood by the user.

13 Claims, 6 Drawing Sheets

↑ X-DATA　↑ Y-DATA　↑ CURSOR/STYLUS BUTTON STYLUS　↑ PROXIMITY STATUS
0 = IN PROX.
1 = OUT OF PROX.

TABLET RESOLUTION - 500 LPI
X ≅ 6.74 INCHES
Y ≅ 6.78 INCHES

METHOD AND APPARATUS FOR DISPLAYING RAW TABLET LOCATION DATA

This invention relates to methods and apparatus for operating digitizer tablets.

BACKGROUND OF THE INVENTION

Digitizer tablets are well known input devices for computers, such as PCs. The January 1989 issue of Byte magazine, pages 162 to 174, describe various types of commercially available tablets and the technologies employed. The basic function of a tablet is to input to the computer X/Y coordinate data representing the current location of a pointing device (stylus, pen, or cursor) on or over the tablet active area. A typical use is to trace with a cursor a diagram on the tablet, and have the diagram accurately reproduced on the display screen of the computer. But, should the display not provide an accurate replica of the diagram, the question arises as to which entity in the chain is malfunctioning. Since the entities involved include not only the tablet, but also the application program getting and using the coordinate data, the driver interfacing the tablet to the computer, as well as the computer, this is not an easy question to answer. It would be very helpful to the user to be able to pin down the problem to the tablet or to the other entities. Other than by returning the tablet to the manufacturer, there is no simple way for a user to test the tablet and establish that it is performing according to its published specifications.

SUMMARY OF INVENTION

An object of the invention is means to enable a user to test the performance of a digitizer tablet.

Another object of the invention is means to enable a user by means of keyboard keystrokes during a computer session to reset a tablet to its original default mode.

These and other objects and advantages of the invention are achieved in accordance with one aspect of the invention, briefly speaking, by means of a program that can be executed on the computer and that will allow a user to test the performance of a tablet connected to the computer. In particular, this program, working in cooperation with the operating system, will display, in text, on the computer display screen the X and Y coordinate positions of the pointing device on the tablet surface.

In accordance with another aspect of the invention, the display on the computer screen also can include data representing the status of an activating switch on the pointing device, and data representing the proximity status of the pointing device.

In accordance with still another aspect of the invention, the user has the ability to reset the status of the digitizer tablet by means of inputs by the user via his computer keyboard. This has the advantage that the user can easily reset the tablet at any time during normal operation, as well as during a test procedure in order to test the tablet in its normal default mode.

SUMMARY OF DRAWINGS

The invention will now be described in greater detail with reference to the accompanying drawings, wherein.

DETAILED DESCRIPTION OF PREFERRED EMBODIMENT

Figure 7:
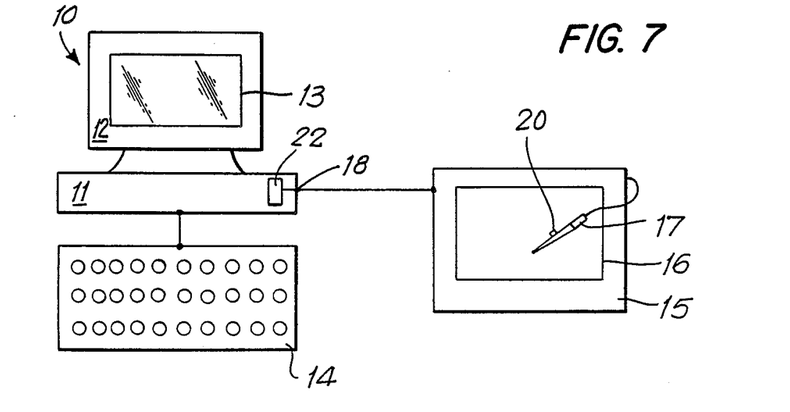
FIG. 7 is a schematic illustrating a typical hardware configuration for using the invention.

Referring first to FIG. 7, a typical user's workstation would comprise a computer 10, such as a PC, including a console 11, a monitor 12 having a display screen 13, and a terminal in the form of a user-operated keyboard 14. Connected to the console by way of a data link is a digitizer tablet 15 having an active area 16 and employing a pointing device 17 connected to the tablet. For the tablet 15 to act as an input device for the computer, a driver is loaded into the computer memory in addition to its usual operating system (MS-DOS or PC-DOS). In operation, in its normal stream mode, the tablet continuously generates X/Y coordinate data which is transmitted to the serial port 18 (usually an RS-232 port) of the computer. An application program when loaded into memory and executing, gets the coordinate data from the driver, the driver translates the data into a format usable by the application, converts it from the tablet active area 16 dimensions to that of the display screen 13, and, depending on the application program, will typically place a cursor on the display screen at a point corresponding to the location of the stylus point on the tablet. Two other features are common with tablets. First, the pointing device may have a switch, indicated at 20, thus allowing the user to control the tablet output. In other words, in a first open switch position, no coordinate data is generated; in a second closed switch position, activated by the user, coordinate data is generated. The second feature is that the tablet is designed so that the stylus point must be within a certain distance from the tablet surface before coordinate data is generated. This is known as the proximity threshold, typically one-quarter to one-half inch. The pointing device is considered in proximity when its distance to the tablet active area is at or below the proximity threshold, and is considered out-of-proximity when above that value.

What the invention accomplishes is to allow the user at his workstation to test the performance of his tablet in a very simple but effective manner. The user can accomplish this by loading into the computer a test program and executing the program while the user manipulates the pointing device 17 over the tablet surface. In its simplest form, he user temporarily affixes to the tablet surface active area 16 a transparent grid, for example of MYLAR, and aligns the grid with the active area, so that one corner of the grid is superimposed on the active area origin of the X/Y coordinate system. For convenience, the grid is dimensioned in inches, so that the user can position the stylus at a specific point on the tablet active area. The advantage of inch dimensions is that tablet resolution is typically given in lines per inch (LPI). It is typical for the tablet electronics to establish pointing device location from the origin by the number of counts of a counter. Thus, assuming a tablet resolution of 500 LPI, when the pointing device is located exactly one inch from the origin on the X-axis, the tablet X-counter will read 500; at two inches, it will read 1000; and so on. The Y-counter would operate similarly. The raw data as used herein thus includes a number representing X-data counts and Y-data counts, and in addition data representing the status of the pointing device switch ("0" for inactive or OFF; "1" for active or ON) for a single switch transducer, and data representing the proximity status ("0" for in proximity, "1" for out-of-proximity). In the case of a cursor which has 4 switches, the button status can have values of 0, 1, 2, 3 or 4 (0=inactive; 1, 2, 3, 4=active), or higher numbers if two or more buttons are pressed. With more switches, a larger range of numbers is possible. A display of the raw data will enable a user to immediately determine operability of the tablet. Thus, if the tablet is in stream mode (meaning coordinate data is continuously being transmitted and the switch is bypassed—a typical operating mode of a tablet), the pointing device is on the tablet surface (thus in proximity) accurately located at the grid corner exactly, say, one inch from both the X and Y axes, assuming the 500 LPI resolution, the user should see displayed on the screen, if the tablet were operating properly, 000500, 000500, 0, 0. This display signifies to the user that the tablet hardware and software is correctly converting the pointing device location, switch status, and proximity status into correct raw data. Thus malfunctions in using the tablet in an application are not in the tablet.

A feature of the invention is that in the stream mode, or with the pointing device switch continuously depressed, the raw data display on the screen is continuous. As displayed, this allows the user to test for tablet jitter, slight changes in output count due to minor fluctuations in the tablet electronics.

Figure 1:
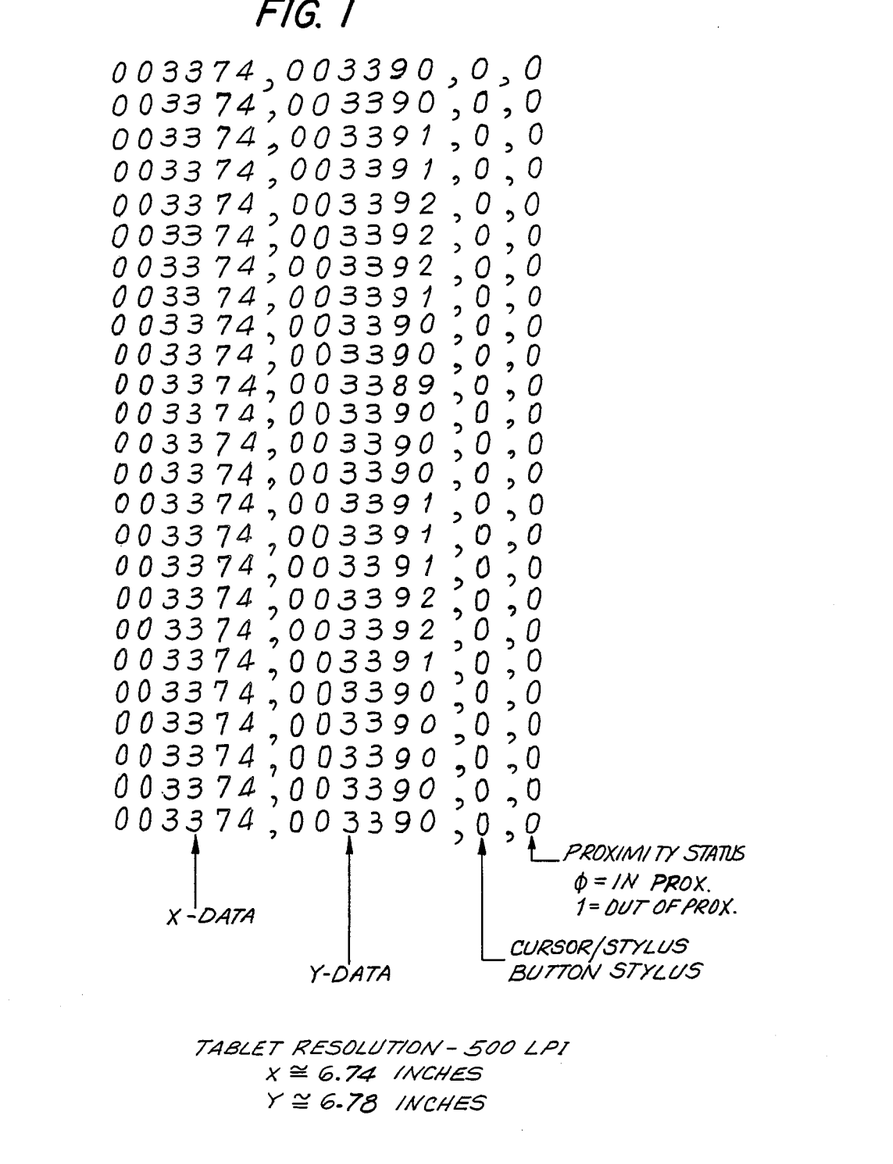
FIG. 1 illustrates a sample screen display when operating a tablet connected to a computer during a test procedure in accordance with the invention.

FIG. 1 illustrates a typical display produced by the test procedure of the invention. In this case, the pointing device, a one-button stylus, was located approximately 6.74 inches from the X-axis and 6.78 inches from the Y-axis. The tablet was in stream mode, with no button depressed, and the stylus was in proximity. The continuously outputted raw data displays the current X-counter value, the Y-counter value, the button status, and the proximity status in a row, with successive rows being displayed at the chosen data rate. Note that the X-data is steady, but the Y-data varies over a range of about 3 counts, indicating minor jitter in the Y-data circuitry. By moving the stylus to a different position, new coordinate data is displayed on the screen. Thus, very quickly, the user can check the tablet performance. In the instance illustrated, dividing each of the X-data and Y-data values by 500 (the tablet resolution), gives the coordinate data in inch dimensions.

The procedure for achieving the above functions is incorporated in the test program that can be loaded and run by the user. The program can contain the usual DOS version check, video mode check, serial port initialization and tablet initialization routines, common to many application programs, and thus need not be repeated here. What follows are descriptions of the main program loop which gets the tablet data packet, extracts the data coordinates, switch and proximity status, converts the raw data into X and Y binary coordinates, and converts the latter into ASCII characters on the screen display as shown in FIG. 1, and the key subroutines executed in the loop.

Figure 2:
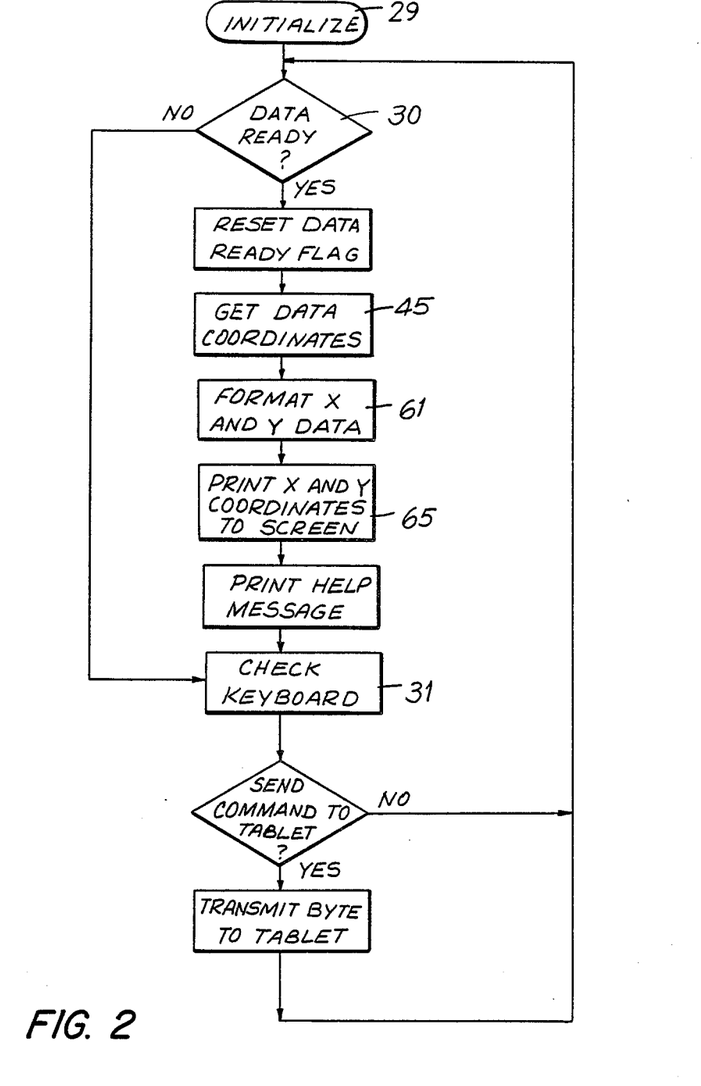
FIG. 2 is a flow chart illustrating the main program loop of the program of the test procedure of the invention.
Figure 4:
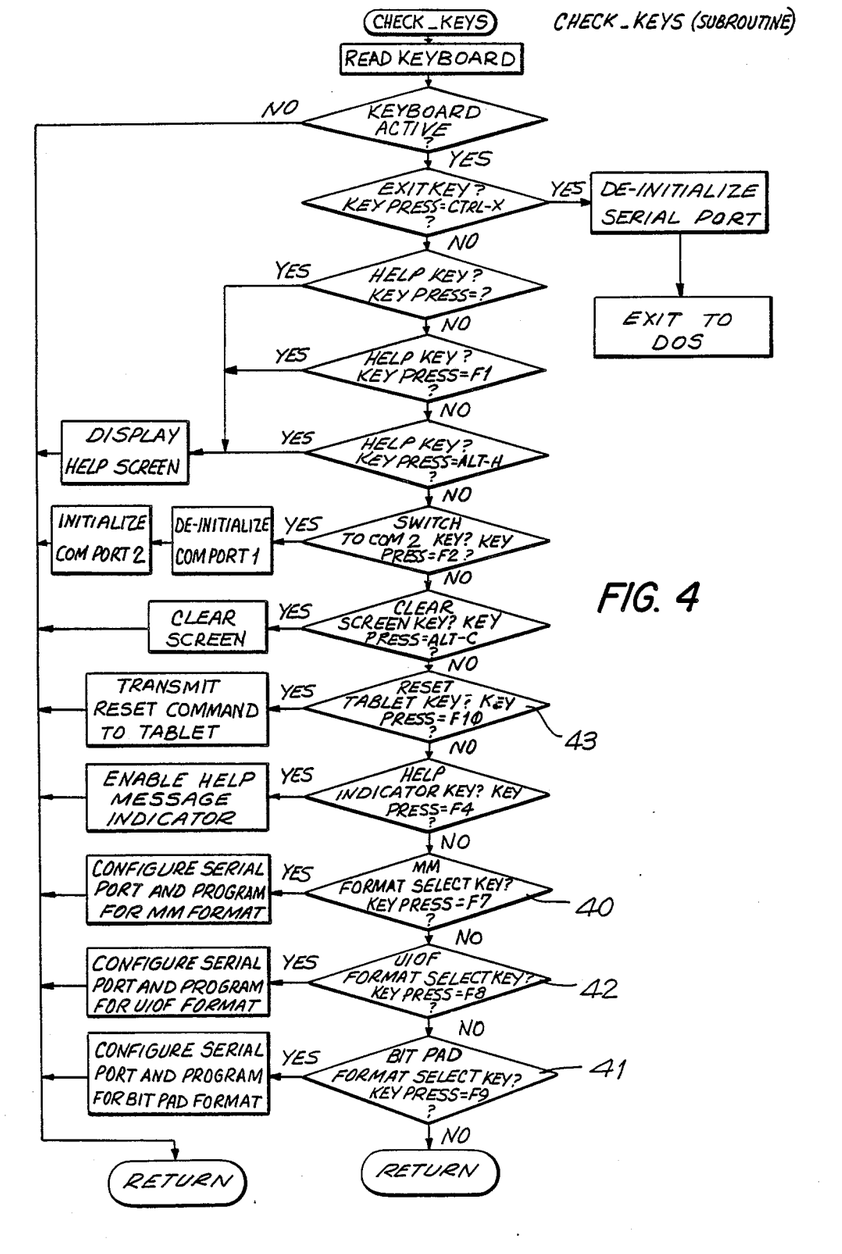
FIG. 4 is a flow chart of the subroutines responding to the user keyboard inputs.

FIG. 2 is a flow chart of the main program loop. After initialization 29, the program checks at decision block 30 the Data Ready Flag to determine whether data is present. The Data Ready Flag is set by a conventional Serial Interrupt Handler Routine. This flag is set when the correct number of bytes have been received. The correct number of bytes is format specific. For example, for the MM format-5 bytes, UIOF-8 bytes, etc. If not set, control is transferred to a check keyboard routine 31 to determine whether the user has activated the keyboard. The check keyboard routine, shown in FIG. 4, is, for the most part, straightforward, and allows the user to call up a help screen, switch from COM port 1 to COM port 2, clear the screen, or exit to DOS as desired. But, in addition, this routine also allows the user to customize the test program for different types of tablets which often adopt different formatting of their raw data, and the test program must be told the kind of tablet that is being tested so it can properly configure the serial port and program for that tablet's format. In the flow chart shown in FIG. 4, the function keys on the keyboard are programmed so that the user can tell the program that one of three kinds of tablets are connected to the computer, the MM at block 40, the Bit Pad at block 41, or the UIOF at block 42, which are names used by Summagraphics Corporation to identify three of its major lines of tablets. It will be evident that the invention is not limited to these formats and can be readily adapted to handle other formats.

In addition, a feature of this invention is that the program will allow the user to reset the tablet by pressing a function key, shown at block 43. This will be further described below.

Returning now to the main program loop of FIG. 2, if the data is ready, the program resets the data ready flag, and enters the get data coordinates routine at 45. This is shown in detail in FIG. 3.

Figure 3:
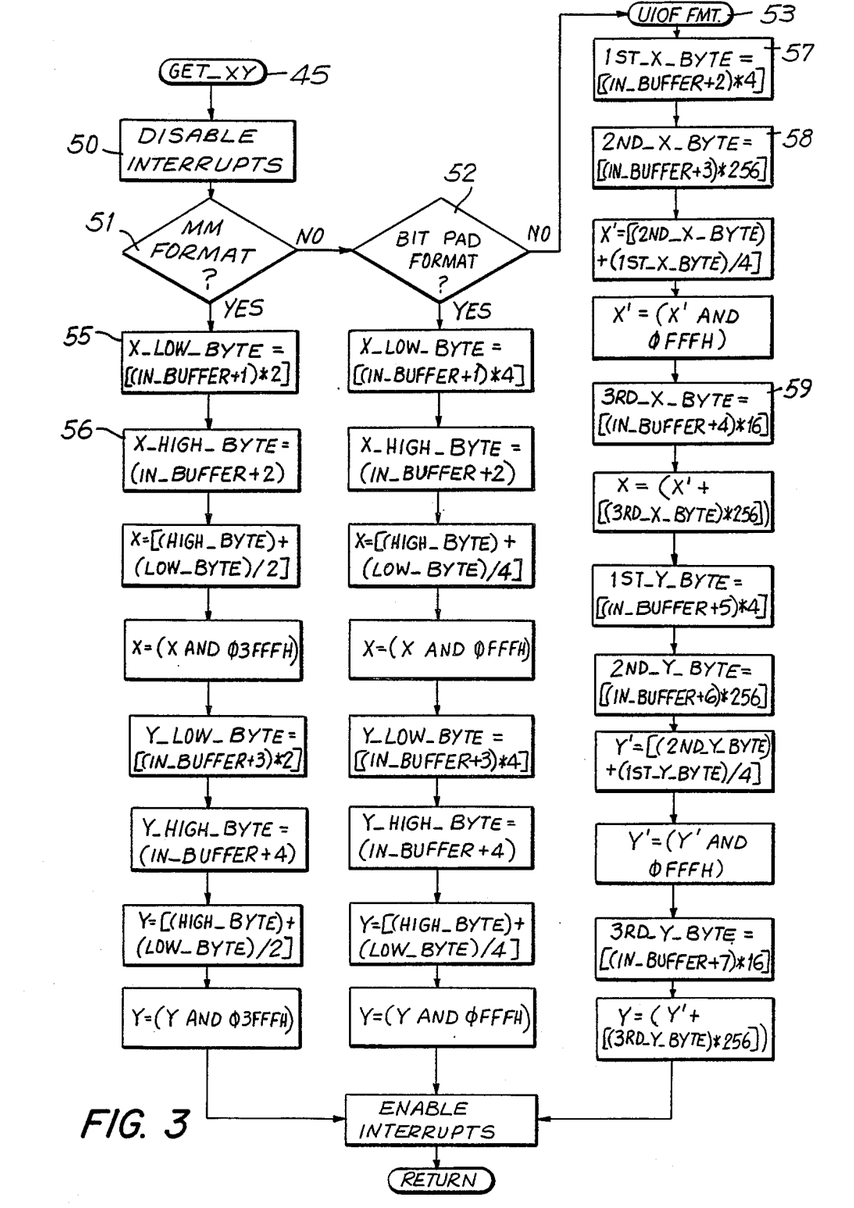
FIG. 3 is a flow chart of the subroutines that convert a raw data packet, from the tablet into X and Y binary coordinates.
Figure 5:
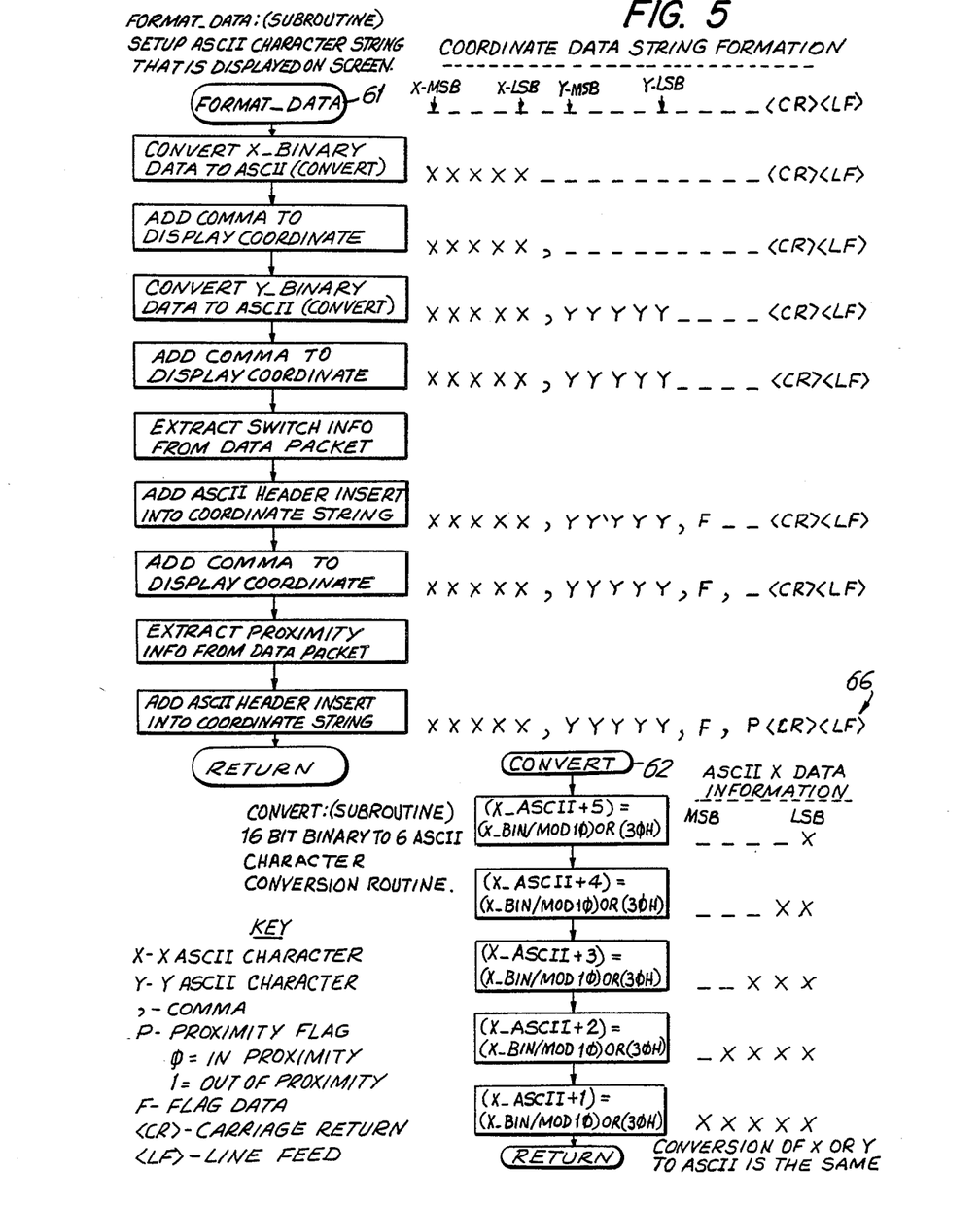
FIG. 5 is a flow chart with explanation illustrating how the X and Y binary coordinates are converted into ASCII characters for display on the computer screen.

The first action taken is to disable interrupts at block 50, and then it inspects internal pgm. flags for the appropriate format at the nodes 51, 52, 53. The user keystrokes are stored as pgm. status flags. It is these flags that are tested at nodes 51, 52, 53. The different formats require different algorithms to convert the raw data packet received from the tablet into X and Y binary coordinate data. Assuming the user had keyed in the MM format, then starting in block 55 the computer is instructed to go to the input buffer (a buffer is created in the PC's memory by the pgm.) which has stored the last tablet data packet received at the port 18 and retrieve and process data located at certain buffer positions representing the X and Y data. Buffer position is format fixed. Buffer size is fixed at 8 bytes. The quantity of format bytes in the buffer depends on the format. For example, MM-5 bytes, and UIOF-8 bytes, etc. X and Y data is located in different positions. In the case of MM format, the X data, a 16 bit integer, is located in two byte chunks at the input buffer +1 and +2 positions, shown in blocks 55 and 56, whereas in the UIOF format, the X data is in three byte chunks at the +2, +3, and +4 positions, shown in blocks 57, 58, and 59. A similar procedure is carried out to retrieve the Y data. The arithmetic functions shown in the various blocks, together with the logical AND functioning, converts the raw data of each of the formats into X and Y binary coordinates. However, in this form, they cannot be displayed. The X and Y binary coordinates are stored, and the main program continues to block 61 which creates a character string, corresponding to a row of the display shown in FIG. 1, containing ASCII characters corresponding to the X/Y binary coordinates, a comma to separate the X from the Y data, and adds ASCII "0" or "1" representing the proximity status. The button status of the transducer included in the string is extracted from the 1st byte, byte 0, of the data packet transmitted from the tablet. FIG. 5 shows a flow chart of the main subroutine 61 on the left, next to it the character string as it is created, and below on the right a subroutine 62 which converts the 16 bit binary X and Y coordinates to 5 ASCII characters. While only 5 digits in the flow chart are shown, the algorithm can be readily modified for 6 positions, as illustrated in the display of FIG. 1, or for more than 6, or less than 5 if desired. The explanation of the symbols is given in the key table at the right. F, for flag data, remains at "0" until the device switch is activated, when it becomes a 1, 2, 3, or 4 (depending on the number of buttons). The carriage return and line feed at the end of each string allow a continuous display of the data, row by row, as received from the tablet. Those skilled in this art will have no difficulty in understanding the algorithms illustrated from the details given in FIG. 5.

Following creation of the character string, the main program goes to block 65 which uses standard PC BIOS functions to display on the monitor screen the character string formed at 66 in FIG. 5. It will be understood that the invention is not limited to the particular sequence of the steps illustrated in FIG. 5, nor to the specific algorithms illustrated, and those skilled in this art will recognize that other routines are available to produce the same end result.

As previously explained, a feature of the invention, shown at 43 in FIG. 4, is the capability of the user to reset the tablet from his computer keyboard. Resetting of a tablet can usually be done in one of two ways. The first is simply by switching the power switch off, and then turning it back on. The tablet will come back on in its default mode, set by DIP switches in the tablet. The tablet can be configured to operate in different modes or with different data rates or formats by sending to the tablet escape sequences or character commands. If the user knows the escape sequence for the default mode, and if the serial port is first configured correctly, he can exit to DOS, key in the sequence of keystrokes to reset the tablet, and then reexecute the test program. It is much more convenient to the user to be able to reset the tablet with a single function key from inside the test program. This is accomplished, in accordance with the invention, in the following manner.

Figure 6:
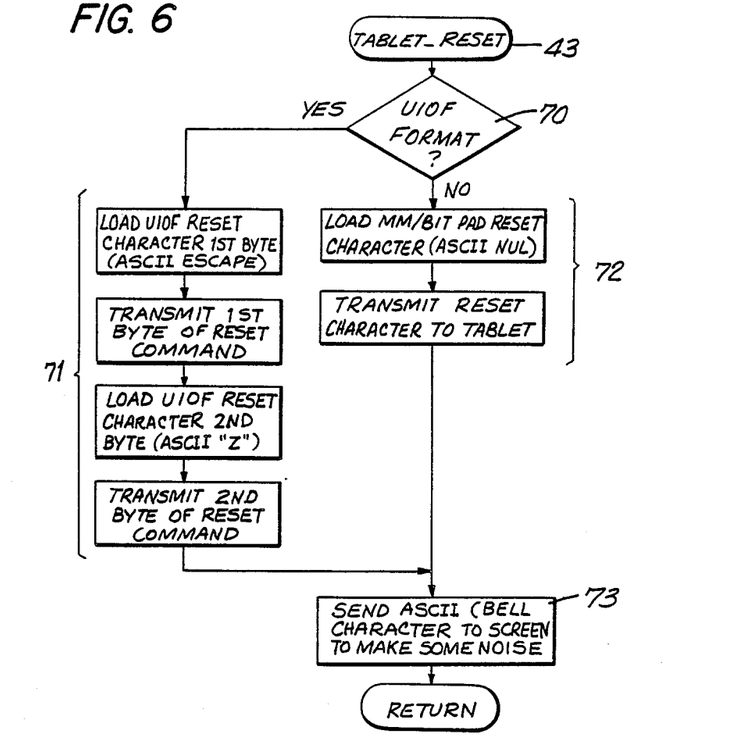
FIG. 6 is a flow chart illustrating operation of the reset routine for the computer.

FIG. 6 shows a flow chart of the reset routine (block 43 in FIG. 4), which sends a reset command to the tablet. It will be understood that this reset feature is not limited to use with the test program and is a stand-alone program that can be incorporated into any software that can control a tablet.

When Tablet_Reset is called, the first block 70 tests for the pgm. flag that indicates the tablet format. The reset command is the same for the MM and Bit Pad tablets (for the specific examples used earlier), but is different for a tablet employing the UIOF format. Hence, if a UIOF format is involved, the program branches to the sequence of blocks shown at 71 at the left, which, as will be evident to one skilled in the art, carries out the necessary steps to transmit first an ASCII escape character and second an ASCII "Z" to the tablet which then resets to its default mode. If the branch shown by the in-line blocks indicated by 72 is taken, only the ASCII NUL character is transmitted which is all that an MM or Bit Pad type tablet requires to reset. A bell is sounded at block 73 to tell the user that reset has been executed. It will be evident that other tablet formats might require another sequence of reset characters and those skilled in the art will know how to modify the program to achieve reset with such other formats.

There has thus been described a novel method and apparatus for allowing a user at his workstation to test his tablet input device simply but effectively. The user from the output display can tell at a glance how his tablet is performing. In addition, the invention allows the user from his keyboard to reset the tablet into its default mode.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A method for displaying raw tablet location data, comprising:
    a. getting data which includes a representation of the X and Y coordinates of the location of a pointing device on or over the tablet surface,
    b. separating the X and Y coordinate information from the data,
    c. converting the X and Y coordinate information into its display equivalent,
    d. displaying on a monitor screen first the display equivalent of the X coordinate and then the display equivalent of the Y coordinate.

2. A method as set forth in claim 1, wherein steps a-d are repeated so long as the tablet is generating said data.

3. A method for displaying raw tablet location data of a pointing device having a button switch cooperating with a tablet having a proximity threshold, comprising:
    (a) getting from the tablet a data packet which includes a representation of the X and Y coordinates of the location of the pointing device on or over the tablet surface and a representation of the button and proximity status,
    (b) separating the X and Y coordinate information from the data packet,
    (c) converting the X and Y coordinate information into binary coordinates,
    (d) converting the X and Y binary coordinates into an ASCII character string containing:
        the ASCII characters for the X binary coordinates,
        the ASCII characters for the Y binary coordinates,
        an ASCII character representing the button status, and
        an ASCII character representing the proximity status,
    (e) displaying on a monitor screen the character string produced in step (d),
    (f) repeating steps (a)-(e) to display a column of rows of said character strings, each row representing a next generation of tablet data.

4. A method as claimed in claim 3, wherein before step (a) is carried out, establishing the format of the raw tablet data packet, and carrying out step (c) by means of an algorithm tailored to the established format of the data packet.

5. A method as claimed in claim 4, wherein, before carrying out step (a), resetting the tablet to its default mode of operation.

6. A method for resetting the tablet to its default mode of operation, comprising the steps of:
   (a) providing a workstation connected to the tablet,
   (b) transmitting to the tablet from the workstation a reset command, said reset command including an ASCII character.

7. A method as claimed in claim 6, wherein the reset command includes the following sequence of characters:
   an ASCII escape followed by "Z", or
   an ASCII NUL.

8. Apparatus for testing a tablet, comprising:
   (a) a workstation, including a computer, a keyboard and a monitor for displaying information,
   (b) a digitizer tablet having a pointing device and connected to said workstation, said digitizer tablet generating and transmitting to the computer a data packet when activated which includes data representing the X and Y coordinates of the pointing device location on or over the tablet, data representing the status of an activating switch on the pointing device, and data representing the proximity status of the pointing device relative to the tablet,
   (c) means executing in the computer for performing the following functions:
      (i) separating the X and Y coordinate information from the data packet,
      (ii) converting the X and Y coordinate information into its display equivalent,
      (iii) displaying on the monitor the display equivalent of the X and Y coordinate information.

9. Apparatus as claimed in claim 8, wherein the means of element (c) performs the following additional functions:
   (iv) first converting the X and Y coordinate information into X and Y binary coordinates,
   (v) then converting the X and Y binary coordinates into an ASCII character string containing the ASCII characters for the X binary coordinates and the ASCII characters for the Y binary coordinates.

10. Apparatus as claimed in claim 9, wherein the means of element (c) also provides in the character string an ASCII character representing the pointing device switch status and an ASCII character representing the pointing device proximity status.

11. Apparatus as claimed in claim 9, further comprising means for transmitting to the tablet from the workstation a command which resets the table to its default mode.

12. In combination, a workstation including a computer having a keyboard and a monitor, and a digitizer tablet having a pointing device connected to the computer, and means for transmitting to the tablet from the workstation a reset command to reset the tablet to its default operating mode.

13. Apparatus as claimed in claim 12, wherein the reset command includes a character string comprising:
   an ASCII escape followed by a "Z", or
   an ASCII NUL.

* * * * *